May 17, 1927.

J. W. COOK 1,629,068

APPARATUS FOR USE IN TREATING COTTON AND OTHER FIBROUS MATERIALS

Filed July 16, 1923  3 Sheets-Sheet 2

Inventor
J. W. Cook
by Laugner Parry Card & Laugner
Attys.

May 17, 1927.

J. W. COOK 1,629,068

APPARATUS FOR USE IN TREATING COTTON AND OTHER FIBROUS MATERIALS

Filed July 16, 1923   3 Sheets-Sheet 3

Patented May 17, 1927.

1,629,068

UNITED STATES PATENT OFFICE.

JOHN WILLIAM COOK, OF MANCHESTER, ENGLAND.

APPARATUS FOR USE IN TREATING COTTON AND OTHER FIBROUS MATERIALS.

Application filed July 16, 1923, Serial No. 651,909, and in Great Britain July 18, 1922.

This invention relates to the treatment of cotton and other fibrous material preparatory to carding.

In the said treatment of cotton as at present carried out a number of machines are employed and the material is put through a number of processes with the object of removing impurities and of obtaining an even and repeatedly doubled lap suitable for treatment in a carding engine. In these processes no considerable alteration is produced in the density and compactness of the material after it has been fed from the mixing bins, since the processes subsequent to mixing, although repeatedly loosening the fibres, invariably terminate with the material being compressed into a lap, this being necessary partly to put the material into a form convenient for feeding to the subsequent machine, but more particularly to enable the said material to be doubled by feeding the fleeces from two or more laps simultaneously.

The chief object of this invention is to provide a method of and means for treating opened cotton without necessitating the multiplicity of preparatory machines such as openers and scutchers at present employed.

Cotton in the bale is first broken in a bale breaker and is then blended or mixed either by hand, pneumatic, or mechanical means; this blended cotton is, according to this invention put through a continuous and progressive process of conversion from a compact matted condition to a light and fleecy one; the material after being opened is treated solely in a mixing bin, a hopper feeder, and one or more pneumatic loosening and doubling machines adapted to deliver the material in the form of a doubled fleece suitable for treatment in a carding engine; and means are provided for regulating the quantity of material fed to the said pneumatic machines.

The material delivered by a hopper feeder is normally sufficient to supply several pneumatic apparatus and measures may be taken to regulate the feeding forward of the material delivered by a hopper feeder so that no pneumatic apparatus receives a greater quantity than is desirable. One method of effecting such regulation is to allow the production to accumulate and the accumulated material to be supplied to the pneumatic machines, as required—for example, by hand. Another method is to provide mechanism adapted automatically to control the speed at which the material from the hopper feeder is fed to the pneumatic apparatus, the said mechanism being also adapted to modify the speed of the hopper feeder in accordance with the quantity of material that it is delivering, so that when more than a predetermined quantity of material is being fed to the pneumatic apparatus—that is to say, more than is required adequately to supply the said pneumatic apparatus—the speed of the said feed and also the output of the hopper feeder are both reduced; and, vice versa when less than the said predetermined quantity is being fed forward the speed of the said feed and also the output of the hopper feeder are increased.

The material from each pneumatic loosening and doubling machine also requires to be divided up amongst several carding engines, and this may be effected by feeding the material to a divided or multiple licker-in adapted to carry it to several air trunks each of which may supply a supplementary pneumatic apparatus from which doubled fleeces may be fed direct to the carding engines.

In the accompanying drawings—

Figure 6 is a plan of means for dividing the product of a pneumatic machine so that the various portions may be fed to several supplemental pneumatic machines.

Like letters indicate like parts throughout the drawings.

Figure 1:
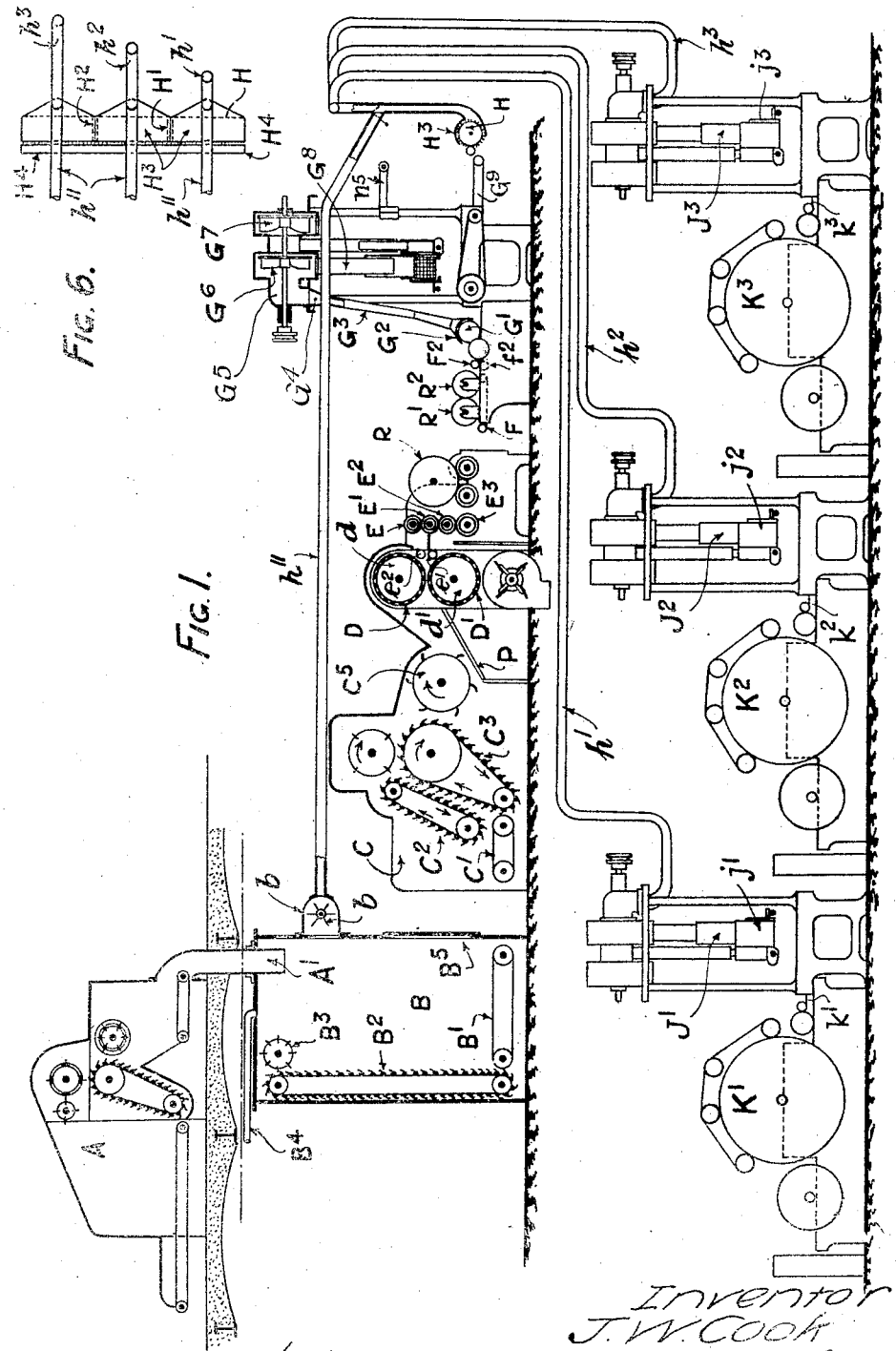
Figure 1 is a general diagrammatic view of one construction and arrangement of apparatus for carrying out the herein described method of treating cotton or other fibrous materials.

First, referring more particularly to Figure 1, A is a bale breaker from which the broken material is fed through a pipe $A^1$ to a bin B, where it is mixed or blended by means of a horizontal feed lattice $B^1$, a spiked mixing lattice B², and a bladed doffer roller B³. The bin B is provided with an air passage B⁴ connected to a fan (not shown). By this means dust laden air may be drawn out of the upper portion of the said bin. B⁵ indicates a door which remains closed during the mixing and blending, but which is opened to enable the mixed and blended material to be removed.

A single bale breaker A will supply sufficient material for several mixing bins B which are charged one after the other and their mechanical mixing devices B¹, B², B³ set in motion. The mixed and blended material is removed manually, or in any other convenient manner from each bin B into several hopper feeders C where it is carried forward by a feed lattice C¹ to two spiked lattices C² C³; the material passes forward between the oppositely moving adjacent portions of the lattices C² C³ to beaters C⁴ C⁵ and is drawn to a pair of perforated rollers D D¹ by suction produced within the said rollers by means of a fan D³ and trunks $d$ $d^1$.

The material passes between the rollers D D¹ and since it is in a very loose condition, and since the quantity delivered from each hopper feeder C by the rollers D D¹ is sufficient to supply several of the machines used later in the process, in order to facilitate the dividing of the material between a number of such later machines the production of the hopper feeder is permitted to accumulate and is fed to the said later machines as required. To this end the material fed forward by the perforated rollers D D¹ is carried, by feed rollers $e$ $e^1$ to rollers E, E¹, E², E³, which form the said material into a soft roll R.

Figure 2:
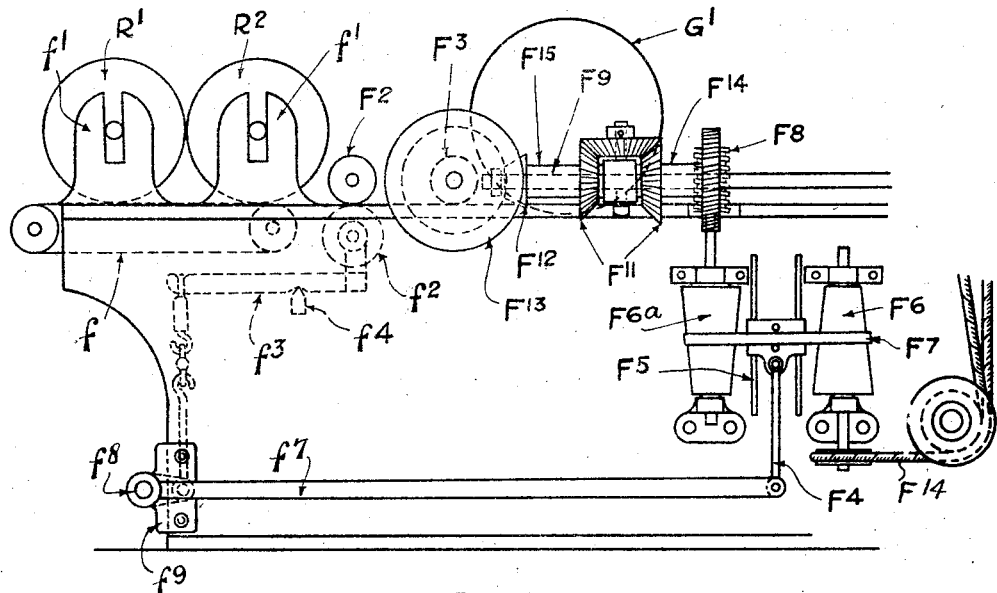
Figures 2 and 3 are respectively side and front elevations of automatic feed-regulating mechanism for controlling the quantity of material fed to the pneumatic machines.
Figure 3:
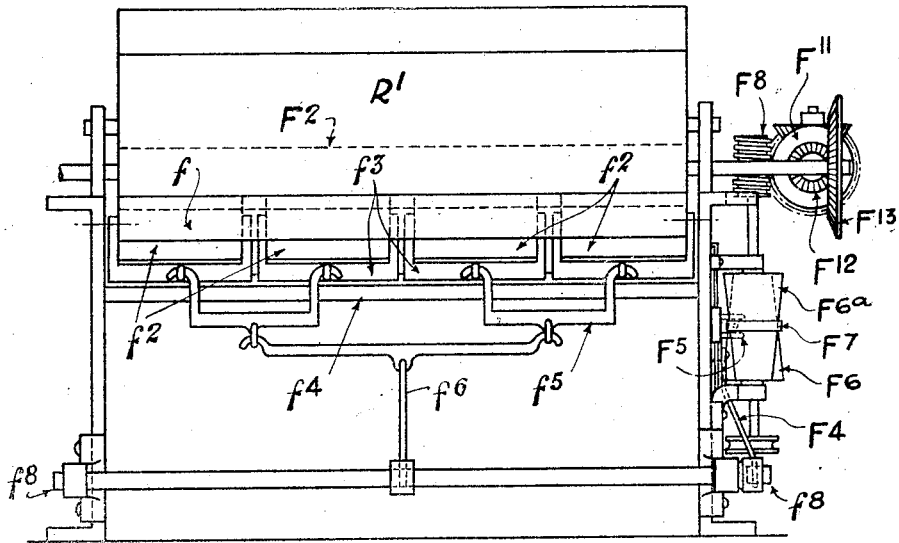

The rolls R are placed as required upon a feed lattice $f$ of a pneumatic loosening and doubling machine G; in the drawing two rolls R¹ R² are shown in fiddle backs $f^1$. As shown best in Figures 2 and 3 there is provided automatic feed-regulating mechanism for controlling the quantity of material fed from the rolls to the pneumatic machine G. The said automatic feed-regulating mechanism comprises a pair of measuring rollers F² $f^2$, a feed roller F³, variable driving mechanism for the feed roller F³, and means—controlled from the rollers F² $f^2$—adapted to act upon the variable driving mechanism to cause the feed roller F³ to be driven at a speed appropriate to the quantity of material passing between the rollers F² $f^2$. The upper roller F² is mounted in fixed bearings and the lower roller $f^2$ is a pedal roller mounted upon levers $f^3$ fulcrumed at $f^4$ and connected through a piano regulator $f^5$ (Figure 3) and a rod $f^6$ to a lever $f^7$ pivoted at $f^8$ to a bracket $f^9$, the other end of the lever $f^7$ being connected by a rod F⁴ to a sliding belt fork F⁵ forming part of a variable driving gear comprising conical pulleys F⁶ F⁶ᵃ, a belt F⁷, worm gearing F⁸, a continuously driven shaft F⁹, epicyclic gearing F¹¹, and bevel gearing F¹² F¹³ that drives the feed roller F³: the worm wheel of the worm gearing F⁸ is mounted upon a sleeve F¹⁴ which also carries a member of the epicyclic gearing, the opposite member of the said gearing is mounted upon a sleeve F¹⁵ which also carries the wheel F¹² of the bevel gearing, is mounted on a bracket carried by the shaft F⁹. It will thus be seen that the speed of the feed roller F³ depends upon the quantity of material passing between the rollers F² $f^2$. The cone F⁶ is driven by a rope F¹⁴ from any convenient rotating part of the pneumatic apparatus.

The said pneumatic loosening and doubling apparatus comprises a licker-in G¹ with a canopy G²; trunks G³, G⁴, G⁵; fans G⁶ G⁷; and reciprocating wire cage delivery apparatus G⁸.

As described in the said specification the machines G deliver the material in light fleeces upon a delivery lattice G⁹, and in accordance with the present invention these fleeces are led forward to a licker-in roller H provided with a feed roller H⁴ and a canopy H³. The production of each pneumatic machine G will usually be sufficient to supply several carding engines,—three being shown in the drawing, K¹ K² K³, and the said material is fed to the carding engines through trunks $h^1$ $h^2$ $h^3$ leading from the canopy H³ of the licker-in H to pneumatic doubling and feeding machines J¹ J² J³—similar to the machines G—which deliver the material in light fleeces upon the feed plates $k^1$ $k^2$ $k^3$ of the said carding engines.

The licker-in H is fitted with dividing plates H¹ H² (Figure 6) which divide the material into approximately equal portions.

Figure 4:
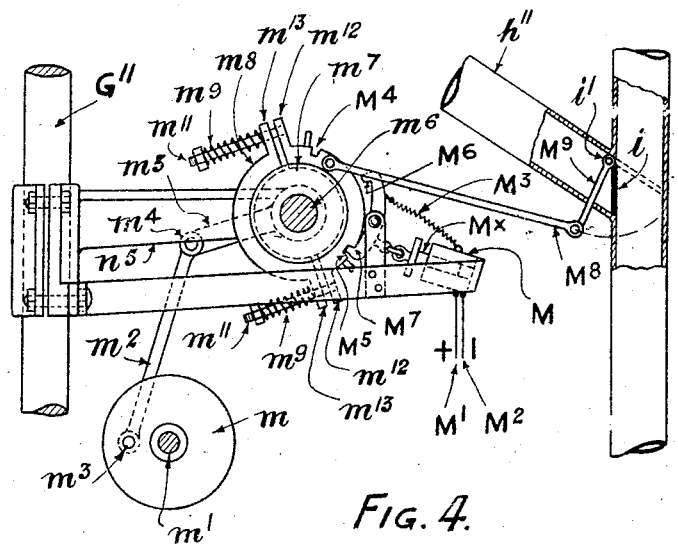
Figures 4 and 5 are respectively a side elevation and a plan of automatic mechanism for returning to an earlier stage in the process any material that is rendered superfluous through any of the cards stopping.
Figure 5:
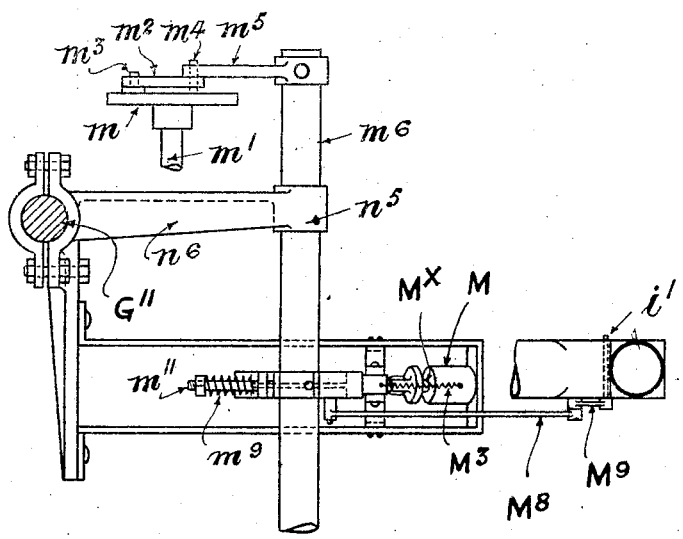

Provision is made for dealing with any material rendered superfluous through any of the cards stopping. The trunks $h^1$ $h^2$ $h^3$ are each fitted with a return trunk (only one $h^{11}$ is shown in the drawing) leading back to the mixing bin B. Each return trunk is controlled by a flapper or switch plate $i$ operated by automatic mechanism M (Figure 1) and shown in detail in Figures 4 and 5, which are respectively a side elevation and a plan. In the said figures, the plate $i$ is shown pivoted at $i^1$ and adapted either to close the trunk $h^{11}$ leaving the trunk $h^1$ open as shown in full lines, or to close the trunk $h^1$ leaving the trunk $h^{11}$ open. $m$ is any convenient continuously driven shaft, $m^1$ is a crank disc mounted thereon and having a connecting rod $m^2$ pivoted thereon at $m^3$, the said rod having its other end pivoted at $m^4$ to a rocking arm $m^5$ of a shaft $m^6$. $m^7$ is a disc secured to the shaft $m^6$ and carrying a strap $m^8$ formed in two parts held together and also held in frictional contact with the periphery of the disc $m^7$ by springs $m^9$ $m^9$ threaded upon rods $m^{11}$ $m^{11}$ secured to lugs $m^{12}$ $m^{12}$ of one part of the strap $m^8$ and passing freely through holes in lugs $m^{13}$ $m^{13}$ of the other part of the said strap. Normally that is to say, while the carding engine ($k^1$) supplied by the trunk $h^1$ is working the parts are in the positions shown in full lines in the drawing, and any convenient device upon the said carding engine or upon the machine $J^1$ connected therewith is employed to keep an electric circuit (indicated at $M^1$ $M^2$) broken so that a solenoid is not excited and a spring $M^3$ maintains a rocking detent $M^5$ $M^6$ with its member $M^5$ in engagement with a notch $M^7$ in the strap $m^8$; but should the card stop from any cause the electric circuit is closed, the solenoid becomes excited, and in drawing its core $M^x$ inward rocks the detent until its member $M^5$ leaves its notch and releases the strap $m^8$ which rocks with the disc $m^7$ whereby the switch plate $i$ is rocked—by a connecting rod $M^8$ and an arm $M^9$—about its pivot $i^1$ into the position indicated in broken lines in which the trunk $h^1$ is closed and the return trunk $h^{11}$ open, when a notch $M^4$ is brought beneath and is engaged by the member $M^6$ of the detent, thus locking the plate $i$ in the position described until the electric circuit $M^1$ $M^2$ is broken, when the action described above is reversed and the parts return to the positions shown in full lines.

The rocking shaft $m^6$ is mounted in bearings $n^6$ of brackets $n^5$ secured to upright members $G^{11}$ of the pneumatic apparatus G.

Each return trunk leads to a chamber $b$ opening into mixing bin B and fitted with a fan $b^1$.

A certain amount of impurities (dust, seed, leaf, immature cotton) are removed in the breaking and mixing, that is to say, before the material comes within the scope of our process; but further provision for the removal of such impurities as still remain in the material is made by arranging grids P beneath the spiked beater $C^5$, and still further cleaning operations are effected at the perforated rollers D $D^1$, at grids beneath the licker-in $G^1$, at the wire cages of the reciprocating delivery apparatus $G^8$, at grids beneath the licker-in H, and at the wire delivery cages $j^1$ $j^2$ $j^3$ of the pneumatic machines $J^1$ $J^2$ and $J^3$.

In the process described above the material is loosened mechanically in the mixing bin and hopper feeder; it is then further loosened by the current of air in the trunks of the pneumatic appliances and doubled by laying a large number of extremely thin ribbon-like layers of material one upon the other so that more efficient doubling is obtained than is feasible even when several openers and scutchers are employed and their relatively thick laps doubled in the usual manner.

Having described my invention, what I claim and desire to secure by Letters Patent in the United States, is:—

1. In apparatus for treating cotton or other fibrous material the combination of means for opening the material, mechanical feeding apparatus adapted to loosen and carry forward the material, a plurality of pneumatic feeding appliances adapted to receive the material from the mechanical feeding apparatus, means adapted to regulate the supply of material to the said pneumatic feeding apparatus, means adapted to deliver the material from the pneumatic feeder in the form of a double fleece, a plurality of carding engines, and means adapted to divide and feed the said doubled fleeces to the various carding engines.

2. In apparatus for treating cotton or other fibrous material the combination of means for opening the material, mechanical feeding apparatus adapted to loosen and carry forward the material, a plurality of pneumatic feeding appliances adapted to receive the material from the mechanical feeding apparatus, means adapted to regulate the supply of material to the said pneumatic appliances, and means adapted to deliver the material from each pneumatic feeder in the form of a doubled fleece, a plurality of carding engines, and means adapted to divide and feed the product of each pneumatic feeder to the plurality of carding engines.

3. In apparatus for treating cotton or other fibrous material the combination of mechanical feeding apparatus adapted to loosen and carry forward the material, a plurality of pneumatic feeding appliances adapted to receive the material from a mechanical feeding apparatus, means adapted to regulate the supply of material to the said pneumatic feeding appliances, means adapted to deliver the material from the pneumatic feeders in the form of a folded fleece, means adapted to divide and carry forward the product of each pneumatic feeder, a plurality of carding engines, and a plurality of supplementary appliances adapted to carry the material from the dividing means to each of the various carding engines.

4. In apparatus for treating cotton or other fibrous materials the combination of mechanical feeding apparatus adapted to loosen and carry forward the material, a plurality of pneumatic feeding appliances adapted to receive the material from the mechanical feeding apparatus, means adapted to regulate the supply of material to the said pneumatic feeding appliances, means adapted to deliver the material from the pneumatic feeders in the form of folded fleeces, means adapted to divide the product of the delivering means, means adapted to carry forward the various divisions of the said product, and a plurality of supplementary appliances each adapted to receive one division of the said product and to deliver the same to a carding engine.

5. In apparatus for treating cotton or other fibrous materials the combination of mechanical feeding apparatus adapted to loosen and carry forward the material, a plurality of pneumatic feeding appliances adapted to receive the material from the mechanical feeding apparatus, means adapted to deliver the material from the pneumatic feeders in the form of folded fleeces, means adapted to divide the product of the delivering means, means adapted to carry forward the various divisions of the said product, and a plurality of supplementary appliances each adapted to receive one division of the said product and to deliver the same in the form of a doubled fleece to a carding engine.

6. In apparatus for treating cotton or other fibrous material the combination of mechanical feeding apparatus adapted to loosen and carry forward the material; a plurality of pneumatic feeding appliances to receive the material from the mechanical feeding apparatus; means adapted to regulate the supply of material to the said pneumatic feeding appliances, the said regulating means comprising feed rollers, variable driving means for said rollers, and means actuated by the material and adapted to control the said variable driving means; means adapted to deliver the material from the pneumatic feeders in the form of folded fleeces, means adapted to divide the product of the delivering means, means adapted to carry forward the various divisions of the said product, and a plurality of supplementary appliances each adapted to receive one division of the said product and to deliver the same to a carding engine.

7. In apparatus for treating cotton or other fibrous material the combination of mechanical feeding apparatus adapted to loosen and carry forward the material; a plurality of pneumatic feeding appliances to receive the material from the mechanical feeding apparatus, a piano regulator, feed rollers for the material, variable speed gearing adapted to drive the feed rollers, means for controlling the variable speed gearing the said means being actuated from the piano regulator; means adapted to deliver the material from the pneumatic feeders in the form of folded fleeces, means adapted to divide the product of the delivering means, means adapted to carry forward the various divisions of the said product, and a plurality of supplementary appliances each adapted to receive one division of the said product and to deliver the same in the form of a doubled fleece to a carding engine.

8. In apparatus for treating cotton or other fibrous material the combination of means for opening the material, mechanical feeding apparatus adapted to loosen and carry forward the material, a plurality of pneumatic feeding appliances adapted to receive the material from the mechanical feeding apparatus, means adapted to regulate the supply of material to the said pneumatic feeding apparatus, means adapted to deliver the material from the pneumatic feeder in the form of a doubled fleece, a plurality of carding engines, a plurality of supplementary appliances each adapted to receive one division of the said product and to deliver the same to a carding engine; means, operable upon the stoppage of a carding engine, adapted to divert the material from the feed of carding engine.

9. In apparatus for treating cotton or other fibrous material a combination of mechanical feeding apparatus adapted to loosen and carry forward the material; a plurality of pneumatic feeding appliances adapted to receive the material from the mechanical feeding apparatus; means adapted to regulate the supply of material to the said pneumatic feeding appliances; means adapted to deliver the material from the pneumatic feeders in the form of doubled fleeces; means adapted to divide a product of the delivering means; feed trunks each adapted to receive one division of the said product; means for producing a flow of air in the said trunks; a plurality of carding engines; a plurality of supplementary appliances each adapted to receive the material supplied by each feed trunk and to deliver the same to a carding engine; return trunks leading from the feed trunks; and means, operable upon the stoppage of a carding engine, adapted to cause the material being carried forward in the feed trunk pertaining to that carding engine to be diverted into a corresponding return trunk.

In testimony whereof I have signed my name to this specification.

JOHN WILLIAM COOK.